(12) United States Patent
Zuber et al.

(10) Patent No.: US 8,021,796 B2
(45) Date of Patent: Sep. 20, 2011

(54) CATALYST-COATED IONOMER MEMBRANE WITH PROTECTIVE FILM LAYER AND MEMBRANE-ELECTRODE-ASSEMBLY MADE THEREOF

(75) Inventors: Ralf Zuber, Großostheim (DE); Klaus Schaack, Obernburg (DE); Sandra Wittpahl, Obertshausen (DE); Alexander Kabza, Neu-Ulm (DE); Markus Maier, Ulm (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 1126 days.

(21) Appl. No.: 10/668,559

(22) Filed: Sep. 22, 2003

(65) Prior Publication Data
US 2004/0091767 A1 May 13, 2004

(30) Foreign Application Priority Data
Sep. 30, 2002 (EP) .................................... 02021990

(51) Int. Cl.
*H01M 2/14* (2006.01)
*H01M 2/08* (2006.01)
*H01M 8/10* (2006.01)
*H01M 4/88* (2006.01)
*B05D 5/12* (2006.01)

(52) U.S. Cl. ........ 429/507; 429/508; 429/479; 427/115; 502/101

(58) Field of Classification Search ............ 429/479
See application file for complete search history.

(56) References Cited

U.S. PATENT DOCUMENTS

| 3,134,697 A | 5/1964 | Niedrach |
| 5,176,966 A | 1/1993 | Epp et al. |
| 5,264,299 A | 11/1993 | Krasij et al. |
| 6,309,772 B1 | 10/2001 | Zuber et al. |

FOREIGN PATENT DOCUMENTS

| EP | 0 586 461 B1 | 3/1994 |
| EP | 0586461 B1 * | 3/1994 |
| EP | 0 690 519 | 5/1997 |

(Continued)

OTHER PUBLICATIONS

Savadogo, "Emerging Membranes for Electrochemical Systems: (I) Solid Polymer Electrolyte Membranes for Fuel Cell Systems," J. New Mat. Electrochem. Systems, 47-66 (1998).

(Continued)

*Primary Examiner* — Karie O'Neill Apicella
(74) *Attorney, Agent, or Firm* — Levin Santalone LLP; John Santalone

(57) ABSTRACT

The present invention relates to the field of electrochemical cells and fuel cells, and more specifically to polymer-electrolyte-membrane fuel cells (PEMFC) and direct methanol fuel cells (DMFC). It is directed to catalyst-coated ionomer membranes ("CCMs") and membrane-electrode-assemblies ("MEAs") that contain one or more protective film layers for protection, sealing and better handling purposes. The one or more protective film layers are attached to the surface of said catalyst-coated membranes in such a way that they overlap with a region of the passive non-coated ionomer area, and with a region of the active area that is coated with a catalyst layer. Furthermore, the present invention discloses a process for manufacture of CCMs and MEAs that contain protective film layers. The materials may be used as components for the manufacture of low temperature fuel cell stacks.

11 Claims, 1 Drawing Sheet

FOREIGN PATENT DOCUMENTS

| | | | |
|---|---|---|---|
| JP | 1 01 54521 A | | 6/1998 |
| JP | 10154521 A | * | 6/1998 |
| WO | WO 98/3325 | | 7/1998 |
| WO | WO 00/10216 | | 2/2000 |
| WO | WO 0010216 | * | 2/2000 |
| WO | WO 00/74160 | | 12/2000 |
| WO | WO 00/74161 | | 12/2000 |

OTHER PUBLICATIONS

European Search Report in corresponding EP application No. 1 403 949 A1, Apr. 29, 2003.

* cited by examiner

CATALYST-COATED IONOMER MEMBRANE WITH PROTECTIVE FILM LAYER AND MEMBRANE-ELECTRODE-ASSEMBLY MADE THEREOF

FIELD OF THE INVENTION

The present invention relates to the field of electrochemical cells and fuel cells.

BACKGROUND

Fuel cells convert a fuel and an oxidizing agent into electricity, heat and water at two spatially separated electrodes. Typically in fuel cells, hydrogen or a hydrogen-rich gas is used as the fuel, and oxygen or air is used as the oxidizing agent.

The energy conversion process in fuel cells is distinguished by particularly high efficiency. For this reason, fuel cells are gaining increasing importance for mobile, stationary and portable applications.

The polymer electrolyte membrane fuel cell (PEMFC) and the direct methanol fuel cell (DMFC, a variation of the PEMFC, powered directly by methanol instead of hydrogen) are two common types of fuel cells that are used as energy converting devices. They are attractive choices because typically, they have compact designs, desirable power densities and high efficiencies.

The technology of fuel cells is well known to persons skilled in the art and is broadly described in the literature, see for example, K. Kordesch and G. Simader, "Fuel Cells and its Applications," VCH Verlag Chemie, Weinheim (Germany) 1996. Nonetheless, in order to aid in the understanding of the present invention, in the following section, certain technical terms and phrases that are used in the present disclosure are described in greater detail:

A "catalyst-coated membrane" (hereinafter abbreviated "CCM") consists of a polymer electrolyte membrane that is provided on both sides with a catalytically active layer. One of the layers takes the form of an anode for the oxidation of hydrogen and the other layer takes the form of a cathode for the reduction of oxygen. Because the CCM consists of three layers (anode catalyst layer, ionomer membrane and cathode catalyst layer), it is often referred to as a "three-layer MEA." As outlined in this disclosure, a CCM may also contain one or more film layers for better protection, handling and sealing of the product.

"Gas diffusion layers" ("GDLs"), sometimes referred to as gas diffusion substrates or backings, are placed onto the anode and cathode layers of the CCM in order to bring the gaseous reaction media (e.g., hydrogen and air) to the catalytically active layers and, at the same time, to establish an electrical contact. GDLs usually consist of carbon-based substrates, such as carbon fiber paper or woven carbon fabric, which are highly porous and provide the reaction gases with good access to the electrodes. Furthermore, they are hydrophobic and permit removal of the product water from the fuel cell. Additionally, GDLs can be coated with a microlayer in order to improve the contact to the membrane. They can also be tailored specifically into anode-type GDLs or cathode-type GDLs, depending on into which side they are built in a given MEA. Furthermore, they can be coated with a catalyst layer and subsequently laminated to the ionomer membrane. These types of catalyst-coated GDLs are frequently referred to as "catalyst-coated backings" (abbreviated "CCBs") or gas diffusion electrodes ("GDEs").

A "membrane-electrode-assembly" ("five-layer MEA") is the central component in a polymer-electrolyte-membrane (PEM) fuel cell and consists of five layers: the anode GDL; the anode catalyst layer; the ionomer membrane; the cathode catalyst layer; and the cathode GDL. A MEA can be manufactured by combining a CCM with two GDLs (on the anode and the cathode side) or, alternatively, by combining an ionomer membrane with two catalyst-coated backings (CCBs) at the anode and the cathode sides. In both cases, a five-layer MEA product is obtained. When the CCM contains one or more protective film layers integrated in the laminated assembly, the five-layer MEA in turn contains the protective film layer or layers as well.

The anode and cathode catalyst layers are comprised of electrocatalysts that catalyze the respective reactions (e.g., oxidation of hydrogen at the anode and reduction of oxygen at the cathode). Preferably, the metals of the platinum group of the periodic table are used as the catalytically active components, and for the most part, supported catalysts are used in which the catalytically active platinum group metals have been fixed in nano-sized particle form to the surface of a conductive support material. By way of example, carbon blacks with particle sizes of 10 to 100 nm and high electrical conductivity have proven to be suitable as support materials. In these applications, the average particle size of the platinum group metal is typically between about 1 and 10 nm.

The "polymer electrolyte membrane" consists of proton-conducting polymer materials. These materials are also referred to below as ionomer membranes. In ionomer membranes, tetrafluoroethylene-fluorovinyl-ether copolymer with sulfonic acid groups is preferably used. This material is marketed, for example, by E.I. DuPont under the trade name Nafion®. However, other, especially fluorine-free, ionomer materials such as sulfonated polyether ketones or aryl ketones or acid-doped polybenzimidazoles may also be used. Examples of materials that are suitable as ionomer materials are described by O. Savadogo in "Journal of New Materials for Electro-chemical Systems" I, 47-66 (1998). For application in fuel cells, these membranes generally have a thickness between 10 and 200 μm.

Within fuels cells such and PEMFCs, one may stack several membrane-electrode-assemblies and bipolar plates in series to obtain the desired voltage output. As persons skilled in the art are aware, in fuel cell stack technology, sealing of components is an important issue. Generally, it is necessary to achieve a gas-tight sealing of these components (predominantly CCMs, MEAs and bipolar plates) against leakage to the environment and against intermixing of the reactants (hydrogen and oxygen/air). This gas-tight seal is essential for the safety of a PEMFC stack. (Lack of safety is a serious obstacle for the widespread introduction of fuel cell technology.) Thus, the quality and endurance of the seals and the materials used for them are of primary importance.

For different stack architectures and operating conditions (such as pressure, temperature, fuel gases and lifetime required) different sealing concepts and technologies must be applied and developed. Furthermore, an appropriate sealing concept for CCMs and MEAs should also take into account an improvement for better protection and better handling of these products. Better handling and processing is particularly important in view of a large scale continuous production of CCMs and MEAs.

Various concepts and technologies for sealing of MEAs and CCMs are described in the prior art.

In U.S. Pat. No. 3,134,697, a sealing function is conventionally achieved by using pre-cut frames of a polymer material and placing these frames around the electrodes of the fuel cell between the membrane and the bipolar plates of the cell. However, this concept suffers from the high efforts needed for exact handling and positioning of the cell, membrane-electrode-assembly and gasket frames. Thus, there is no close contact between membrane and sealing.

EP 690 519 addresses the stabilization of the membrane in the inactive sealing region. It relates to an assembly consisting of at least one seal layer in a solid polymer ion exchange layer, wherein the seal layer or layers cover essentially only the region of the ion exchange layer that is to be sealed. According to this application, the sealing layer is made of polytetrafluoroethylene (PTFE) film having one surface coated and partially impregnated with the ionomer material.

A similar concept is pursued in WO 00/74160. This document describes a membrane electrode unit for fuel cells. There the membrane electrode unit comprises a reinforcing frame that is situated on the periphery and in the area of openings that are placed in the active portion of the membrane electrode unit and provided for guiding material or for installation. A reinforcing frame is formed by a hot melt type adhesive layer that is applied on both sides and is formed by at least one rigid plate.

All of these concepts described in the aforementioned references are based on sealing frames or layers that cover the peripheral membrane rim of the CCM/MEA and only stabilize this peripheral rim. However, depending on fuel cell operating parameters, frequently failures in the membrane material may occur at the interface between the active area and the sealing layers. Therefore, sufficient overlap is needed between the sealing/gasket layer, the active electrode layer and the ionomer membrane.

WO 00/74161 relates to a membrane-electrode-assembly provided for fuel cells or the like that comprises an ionomer membrane that is coated on both sides with electrodes. The sealing edge, which is configured on the outer periphery, is comprised of a hot melt adhesive whose hydrocarbon skeleton carries, at regular intervals, ionic or strong polar groups that enter into a surface interaction with the ionic groups of the membrane material and thus provides for good adhesive effect of the hot melt type adhesive to the polymer electrolyte membrane. The thermoplastic sealing made of hot melt type adhesive extends on both sides over the edge section of the membrane. Unfortunately, associated with this method are high production costs, as well as costs for the application form of the hot-melt adhesive. Furthermore, its long-term stability is not proven; various components (such as hardeners, defoamers and other additives) may be leached out during operation and may cause deterioration of the MEA.

WO 00/10216 describes a membrane electrode gasket assembly ("MEGA") having a gasket and a sub-gasket to seal the MEA and to protect it from possible edge failures. The gasket material typically consists of expanded polytetrafluoroethylene (e-PTFE), soaked with a solution of ionomer for better adhesion. The sub-gasket is disposed over a peripheral portion of an electrode, which is applied to a central portion of an ionomer membrane. In the examples given in WO 00/10216, a simultaneous overlapping of the sub-gasket with the electrode portion and the non-coated ionomer membrane portion is not disclosed.

A different concept is suggested in U.S. Pat. No. 5,176, 966. According to that patent, seals are formed by impregnating the layers of porous electroconductive sheet material of the membrane electrode assembly with a sealant material that generally circumscribes the fluid passage openings and the electrochemical active portions of the assembly.

Another disclosure, WO 98/33225, is directed to a sealing that penetrates an edge of at least one gas diffusion electrode (GDE) whereby the pores of the electrodes are filled. In that disclosure, the sealing is bonded to the membrane where the sealing penetrates the electrodes and comes into contact with the membrane and is also bonded to the peripheral face of the membrane. Both surfaces of the membrane are essentially completely covered by the electrodes.

The latter two concepts, which are based on impregnation of gas diffusion electrodes (GDEs) with a sealant material, suffer from the complexity of the impregnation process. Even small deviations of the process parameters strongly affect quality of sealing and the smoothness of the contact surface of the sealed area. Consequently, it is very difficult to obtain gas-tight seals.

In light of the shortcomings of the prior art, the present invention is directed to an improved catalyst-coated membrane that avoids the described disadvantages of the state of the art. In particular, the present invention provides a catalyst-coated membrane embracing one or more protective film layers that offers the following advantages: (i) improved mechanical stability; (ii) improved protection against membrane damage; and (iii) improved handling properties in cell/stack assembly. The present invention also provides an improved membrane-electrode-assembly (MEA) that offers the above-mentioned advantages. Finally, a process for manufacture of these improved products is outlined.

SUMMARY OF THE INVENTION

The present invention relates to the field of electrochemical cells and fuel cells, more specifically to polymer-electrolyte-membrane fuel cells (PEMFC) and direct methanol fuel cells (DMFC), and describes catalyst-coated ionomer membranes ("CCMs") embracing one or more film layers for protection, sealing and handling purposes. The catalyst-coated membranes may, for example, be used as components for membrane-electrode-assemblies (MEAs) in low temperature fuel cell stacks.

According to one embodiment, the present invention provides a catalyst-coated membrane that comprises:
 a) an ionomer membrane, wherein said ionomer membrane comprises two surfaces and each of said two surfaces is comprised of:
  (i) an active area, wherein said active area is coated with a catalyst layer; and
  (ii) a passive area; and
 b) at least one layer of protective film attached to each of the two surfaces of said catalyst coated membrane, wherein said at least one layer of protective film overlaps the active area and the passive area.

According to a second embodiment, the present invention provides a catalyst-coated membrane-electrode-assembly comprising:
 (a) an ionomer membrane, wherein said ionomer membrane comprises two surfaces and each of said two surfaces is comprised of:
  (i) an active area, wherein said active area is coated with a catalyst layer, and
  (ii) a passive area; and
 (b) at least one gas diffusion layer, wherein said at least one gas diffusion layer covers the active area of said catalyst-coated membrane; and
 (c) at least one layer of protective film, wherein said at least one layer of protective film contacts the active area, the passive area and the gas diffusion layer to form:
  (i) an overlapped region of the active area,
  (ii) an overlapped region of the passive area, and
  (iii) an overlapped region of the gas diffusion layer.

In both of these embodiments, the passive area is the area of the ionomer membrane that has not been coated with a catalyst layer, and preferably, it forms a perimeter around the active area.

These CCM and MEA are preferably manufactured under pressure and heat for a period of 0.1 to 15 minutes. More preferably, the pressure is in the range of 10 to 100 bar and the temperature is in the range of 20 to 200° C.

DETAILED DESCRIPTION OF THE INVENTION

Figure 1:
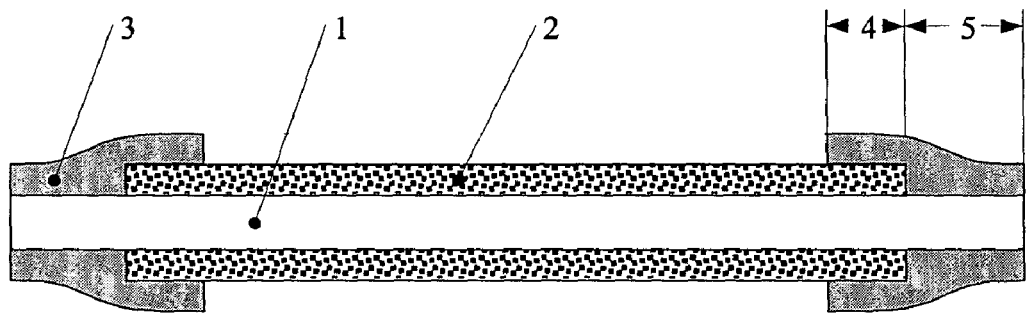
FIG. 1 is a representation of a catalyst-coated membrane (CCM) according to a first embodiment of the present invention.

The present invention is directed to catalyst-coated membranes and membrane-electrode-assemblies that contain ionomer membranes that have both an active area, which has a catalyst layer, and a passive area. Both of these areas are at least in part coated with a protective film. In the MEA, the active area may be coated with a gas diffusion layer.

The present disclosure is not intended to be a treatise on catalyst-coated membranes or membrane-electrode-assemblies. Readers are referred to appropriate available texts for background on these subjects.

According to the present invention, the catalyst coated membrane preferably comprises an ionomer membrane that itself is comprised of a substance selected from the group consisting of perfluorinated sulfonic acid polymers, acid-doped polybenzimidazoles, acid-group-modified polyetherketones, ionically conductive organic/inorganic materials and composite reinforced materials.

Ionomers membranes typically have two sides that contain catalytically active materials. Each of these sides is referred to herein as a "surface." On each of the two surfaces of the ionomer membrane, there is both an active area and a passive area. The active area, which corresponds to the electrode area is coated with a catalyst layer. The passive area, which is not coated, preferably forms a peripheral rim around the active area.

A protective film layer covers at least a portion of both the active area and the passive area. The protective film layer embraces the CCM on both sides of the membrane, and has two main features. First, it overlaps the active area in a certain region sufficient for prevention of membrane damage. Second, it overlaps a significant region of the passive, non-coated area of the CCM. The region of the active area overlapped by the protective film layer is preferably in the range of 0.5 to 20% of the total active area, and more preferably in the range of from 3 to 10%. On the other hand, the region of the passive membrane area overlapped by the protective film layer is preferably in the range of 80 to 150%, more preferably in the range of 80 to 100% and most preferred equal to 100%, of the total non-coated membrane area. Overlapping of more than 100% in the context of the present invention means that the protective film would extend over the periphery of the ionomer membrane.

Preferably, the film comprises an organic polymer material with a thickness in the range of 10 to 150 microns. More preferably, the organic polymer material is a thermoplastic or duroplastic polymer comprised of a polymer selected from the group consisting of polytertrafluoroethylene, PVDF, polyester, polyamide, co-polyamide, polyamide elastomers, polyimide, polyurethane, polyurethane elastomers, silicones, silicon rubbers and silicon based elastomers.

Generally, one or more film layers can be applied on the front and/or on the back surface of the catalyst-coated membrane. During lamination, the protective film softens and can penetrate the electrode layer.

In a preferred embodiment, the protective film layers are applied as frames on both sides of the ionomer membrane. However, other patterns and dimensions are possible.

The protective film layer or layers may be punched or perforated as needed for certain bipolar plate and PEM stack architectures. Additional layers of protective films, such as gaskets or sealant materials may be added afterwards.

Figure 2:
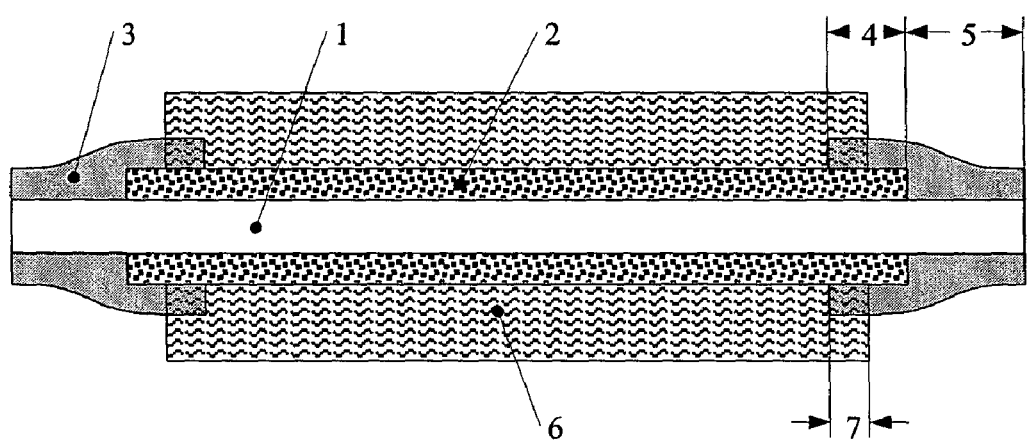
FIG. 2 is a representation of a cross-section of a membrane electrode assembly (MEA) with protective film layers according to a second embodiment of the present invention.

The present invention has two major embodiments, which are demonstrated in FIGS. 1 and 2, and that may be incorporated into and operated in fuel cells such as PEMFCs and DMFCs.

FIG. 1 shows a schematic drawing (cross section) of a catalyst-coated membrane (CCM) according to the first embodiment of the present invention. According to this embodiment, the ionomer membrane (1) is coated on both sides with an electrode layer (2) forming the active area of the catalyst-coated membrane. Two frames of protective film layer (3) are applied on both sides to the passive area of the membrane (1) in such a way that the film layers overlap with the electrode layers in an area region (4), and, simultaneously, with the passive, non-coated area of the ionomer membrane in an area region (5). On each side of the membrane, the region covered or overlapped by the protective film layer is in the range of 0.5 to 20% of the total active area of the membrane.

The protective film may be made of a polymer that is more rigid than the ionomer membrane. The thickness of the protective film is preferably in the range of 10 microns to 150 microns (more preferably in the range of 80 to 120 microns), which enables it to constitute a protection for the ionomer membrane against pressure, impact, wear, heat, drying out, etc. The protective film layer is tightly fixed onto the membrane. It can be pre-shaped and heat-laminated or attached by an adhesive onto the membrane. It can also be formed by coating (by paste application, printing process, etc.) the non-coated membrane area with an appropriate polymer paste or polymer emulsion.

The respective materials should be stable and resistant to the operating conditions of a PEM fuel cell. Furthermore, the materials should have high endurance and lifetime, as well as high purity in respect to trace contaminants, residual volatile components and other inorganic or organic materials that could be leached out during operation of the fuel cell.

FIG. 2 depicts a cross-section of a membrane electrode assembly (MEA) with protective film layers according to the second embodiment of the present invention. In this second embodiment, the active area of the CCM according to embodiment 1 is covered by gas diffusion layers (GDLs) in such a way, that the gas diffusion layers contact, overlap and/or penetrate the protective film layer applied to the CCM. Again, the ionomer membrane (1) is coated with an electrode layer (2) on both sides. The area of the active layer (2) (the "active area") is smaller than the total area of the ionomer membrane, which results in a peripheral rim of uncoated ionomer material (which is the passive non-coated area) around the central active area of the CCM. As already described in embodiment 1, two frames of protective film layers (3) are attached on both sides to the passive area of the membrane (1) in such a way that the film layers overlap with the electrode layers in an area region (4), and, simultaneously, with the passive, non-coated area of the ionomer membrane in an area region (5). On each side of the CCM, the region covered/overlapped by the protective film layer is in the range of 0.5 to 20% of the total active area. Both surfaces of the CCM are additionally covered by gas diffusion layers (6). These two gas diffusion layers (GDLs) overlap/contact the protective film layer disposed over part of the active area at both sides of the membrane (overlapping region 7).

In a preferred embodiment, the dimensions of the GDL and that of the active area are identical. In this case, the region of the active area of the CCM overlapped by the protective film and the region of the GDL in contact with the protective film are identical. However, other embodiments, involving GDLs with bigger or smaller dimensions compared to the active CCM area, are possible. Thus, the region of the GDL contacted by the layer of protective film can be in the range of 0.5 to 50% of the total area of the gas diffusion layer.

It is furthermore feasible, to provide the protective film in a first step as a liquid, to press the GDL into the liquid film and to cure the film providing a solid protective film penetrating the GDL.

Commercially available GDLs, as well as other suitable materials can be used for the formation of the membrane-electrode-assembly (MEA) according to this invention. As base materials for GDLs, woven carbon cloth, non-woven carbon fiber layers or carbon fiber papers can be used. Typical GDL base materials include Toray TGP-H-060 and Textron AvCarb 1071 HCB supplied by Textron Inc. The gas diffusion layers may or may not be treated to be hydrophobic. Additionally, they may comprise additional carbon black microlayers and catalyst layers, if necessary.

Bonding of the GDLs to the CCM can be conducted by application of pressure and heat. Appropriate bonding or laminating conditions have to be adopted to the mechanical stability of the individual base material of the GDLs.

EXAMPLES

The following examples describe the scope of the invention in more detail. These examples are presented to aid in an understanding of the present invention and are not intended, and should not be construed, to limit the invention in any way.

Example 1

The catalyst-coated membrane used in this example was manufactured according to U.S. Pat. No. 6,309,772, example 3, ink A. A 40 wt. % Pt/Vulcan XC72 catalyst was used as cathode catalyst, and a 40 wt. % PtRu (1:1)/Vulcan XC72 was employed for the anode side. The CCM product is available at OMG under the designation "CCM-Type 7C" and was used with a 100 cm$^2$ (10×10 cm) of active area. The passive area (the non-coated area) of the CCM had a size of 1.0 cm in width, resulting in overall CCM dimensions of 12×12 cm with the active area centered in the middle.

Co-polyamide Vestamelt 3261 (Degussa, Düsseldorf) was provided as an extruded film of 120 μm thickness. From this film, two square-sized frames were punched with inner dimensions of 9.8×9.8 cm and outer dimensions of 12×12 cm.

The catalyst-coated membrane was placed between the two frames of protective film, and the assembly was covered by two sheets of PTFE blanks. The protective film frames were positioned with respect to the catalyst-coated membrane so that the peripheral membrane rim was completely covered, and a 2 mm broad region of the active area was overlapping with the inner edge of the frame of protective film on both sides of the CCM. Thus, the area of the overlapping region was 4% of the total active area on both sides of the CCM. The region of the protective film overlapping with the non-coated membrane area was 100% of the total non-coated membrane area on both sides of the CCM.

The package was placed between two graphite press plates and transferred into a press with a temperature of 165° C. Lamination was completed after 3 minutes at a pressure of 27 bar. The whole package was cooled down to room temperature while maintaining the pressure and then released from the press and disassembled. The frame of protective films around the active area adhered very well to both sides of the CCM.

Subsequently, the catalyst-coated membrane and two gas diffusion layers (GDLs), one on the anode side and one on the cathode side, were mounted into a PEM single cell and tested in hydrogen/air operation at 2.7 bar operating pressure at 70° C. cell temperature. The electrical performance was in the range of 650 mV at a current density of 600 mA/cm$^2$. During and after operation, no leakage of reactive gases was observed. Furthermore, the CCM with the protective film layers withstands frequent assembly and disassembly processes without damage.

Example 2

A catalyst-coated membrane (CCM) with protective film layers on both sides was prepared according to the procedure described in example 1. Instead of the co-polyamide material, a polyurethane-based film material (Walopur 4201AU, Epurex/Germany) with a thickness of 90 μM was used as the protective film layer. Lamination parameters were 27 bar and a temperature of 145° C. for 2 minutes. The overlapping area of the protective film was about 5% of the total active area on both sides of the CCM. Furthermore, the overlapping area of the protective film with the non-coated area was about 100% of the total non-coated area. The catalyst-coated membrane and two GDLs were again mounted into a PEM single cell and tested in hydrogen/air operation at 1.0 bar/70° C. for an extended period of 300 hours. An excellent long-term performance was obtained. Microscopic inspection of the catalyst-coated membrane showed no indications for damage, either in the protective layers or at the interface between protective layer and active area of the CCM.

Example 3

A catalyst-coated membrane (CCM) with protective films was prepared as described in example 1. The overlapping area of the protective films on both sides of the CCM was 9.25% of the total active area. The overlapping area with the passive, non-coated membrane area was 100%. Then the catalyst-coated membrane was placed between two GDLs (Sigracet 30BC from SGL Carbon, Germany) and the assembly was covered with two Teflon blanks. The GDLs were of the same size as the active area of the CCM (i.e. 100 cm$^2$). The positioning of the gas diffusion layers was so that they completely covered the active area of the CCM and simultaneously overlapped with the protective film layer, which in turn overlapped with the active area of the CCM (see e.g., FIG. 2). Thus, the contacting/overlapping area of each GDL with the protective film layer was 9.25% of the total GDL area.

The complete package was placed between two graphite press plates in a press with a temperature of 170° C. Lamination was completed after 3 minutes at a pressure of 25 bar. The whole package was cooled down to room temperature while maintaining the pressure and then released from the press and disassembled. The GDLs adhered well to the CCM thus forming a 5-layer membrane electrode assembly (MEA) with protective film layers on both sides.

The MEA was mounted into a PEMFC single cell and tested in hydrogen/air operation at 1.0 bar/70° C. for 300 hours. A good long-term performance was obtained. Microscopic inspection of the 5-layer MEA showed no indications for damage, either in the protective layers or at the interface between the protective layers and the active area of the Membrane Electrode Assembly.

Having thus described and exemplified the invention with a certain degree of particularity, it should be appreciated that the claims that follow are not to be so limited but are to be afforded a scope commensurate with the wording of each element of the claims and equivalents thereof.

The invention claimed is:

1. A catalyst-coated membrane with protective film layer comprising:
   (a) a catalyst-coated ionomer membrane consisting essentially of an anode catalyst layer, an ionomer membrane, and a cathode catalyst layer, wherein said ionomer membrane comprises two surfaces and each of said two surfaces comprising:
      (i) an active area, wherein said active area is coated with said anode or cathode catalyst layer, and
      (ii) a passive area; and
   (b) at least one layer of protective film attached to each of the two surfaces of said catalyst-coated ionomer membrane, wherein said at least one layer of protective film overlaps the passive area and the active area of each surface and wherever the protective film overlaps the active area the protective film is in direct contact with the catalyst layer and there exists a sequence of layers of membrane-catalyst layer-protective film with no interposed layers.

2. The catalyst-coated membrane according to claim 1, wherein said passive area forms a perimeter around said active area.

3. The catalyst-coated membrane according to claim 1, wherein the region of the active area that is overlapped by the at least one layer of protective film is in the range of 0.5 to 20% of the total active area of the membrane, and the region of the passive area that is overlapped by the at least one layer of protective film is in the range of 80 to 150% of the total passive area.

4. The catalyst-coated membrane according to claim 1, wherein the at least one layer of protective film comprises an organic polymer material with a thickness in the range of 10 to 150 microns.

5. The catalyst-coated membrane according to claim 4, wherein the organic polymer material comprises a polymer selected from the group consisting of polytetrafluoroethylene, PVDF, polyethylene, polypropylene, polyester, polyamide, co-polyamide, polyamide elastomers, polyimide, polyurethane, polyurethane elastomers, silicones, silicone rubbers, and silicon based elastomers.

6. The catalyst-coated membrane according to claim 1, wherein the ionomer membrane comprises a substance selected from the group consisting of perfluorinated sulfonic acid polymers, acid-doped polybenzimidazoles, acid-group-modified polyetherketones, ionically conductive organic/inorganic materials and composite reinforced materials.

7. A membrane-electrode-assembly comprised of:
   (a) the catalyst-coated membrane according to claim 1; and
   (b) at least one gas diffusion layer, wherein said at least one gas diffusion layer covers at least a portion of the active area of said catalyst-coated membrane and contacts, overlaps and/or penetrates the at least one layer of protective film of the catalyst-coated membrane.

8. The membrane-electrode-assembly according to claim 7, wherein the region of the active area contacted by the at least one layer of protective film is in the range of 0.5 to 20% of the total active area of the membrane, the region of the passive area contacted by the at least one layer of protective film is in the range of 80 to 150% of the total passive area of the membrane and the region of the gas diffusion layer contacted by the at least one layer of protective film is in the range of 0.5 to 50% of the total area of the gas diffusion layer.

9. PEM or DMFC fuel cell stack that comprises the catalyst-coated membrane of claim 1.

10. PEM or DMFC fuel cell stack that comprises the membrane electrode-assembly of claim 7.

11. A catalyst-coated membrane with protective film layer consisting essentially of:
   (a) a catalyst-coated ionomer membrane consisting essentially of an anode catalyst layer, an ionomer membrane, and a cathode catalyst layer, wherein said ionomer membrane comprises two surfaces and each of said two surfaces comprising:
      (i) an active area, wherein said active area is coated with said anode or cathode catalyst layer, and
      (ii) a passive area; and
   (b) at least one layer of protective film attached to each of the two surfaces of said catalyst-coated ionomer membrane, wherein said at least one layer of protective film overlaps the passive area and the active area of each surface and wherein the protective film is in direct contact with said anode or cathode catalyst layer so that a layer sequence consisting of membrane-catalyst layer-protective film is formed in a region of each active area.

\* \* \* \* \*